(12) United States Patent
Miranda et al.

(10) Patent No.: US 11,985,098 B2
(45) Date of Patent: May 14, 2024

(54) INTENT PREDICTION FOR DIALOGUE GENERATION

(71) Applicant: Capital One Services, LLC, McLean, VA (US)

(72) Inventors: Victor Alvarez Miranda, McLean, VA (US); Rui Zhang, New York, NY (US); Vinay Igure, Ashburn, VA (US); Scott Karp, Washington, DC (US); Erik Mueller, Chevy Chase, MD (US); Tanushree Luke, Alexandria, VA (US); Kunlaya Soiaporn, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/167,801

(22) Filed: Feb. 10, 2023

(65) Prior Publication Data

US 2023/0188484 A1 Jun. 15, 2023

Related U.S. Application Data

(63) Continuation of application No. 17/543,106, filed on Dec. 6, 2021, now Pat. No. 11,582,172, which is a continuation of application No. 16/821,406, filed on Mar. 17, 2020, now Pat. No. 11,223,582, which is a continuation of application No. 16/821,008, filed on Mar. 17, 2020, now Pat. No. 10,798,030.

(60) Provisional application No. 62/942,588, filed on Dec. 2, 2019.

(51) Int. Cl.
*H04L 51/02* (2022.01)
*G06F 40/56* (2020.01)
*G06N 3/08* (2023.01)
*H04L 51/04* (2022.01)

(52) U.S. Cl.
CPC .............. *H04L 51/02* (2013.01); *G06F 40/56* (2020.01); *G06N 3/08* (2013.01); *H04L 51/04* (2013.01)

(58) Field of Classification Search
CPC ............ H04L 51/04; G06F 40/56; G06N 3/08
See application file for complete search history.

(56) References Cited

U.S. PATENT DOCUMENTS

| | | | |
|---|---|---|---|
| 2018/0217990 A1* | 8/2018 | Kumar | G06F 16/9535 |
| 2018/0367484 A1 | 12/2018 | Rodriguez et al. | |
| 2022/0215957 A1* | 7/2022 | Chen | G06N 5/01 |
| 2022/0414331 A1* | 12/2022 | Asthana | G06N 3/044 |

OTHER PUBLICATIONS

Extended European Search Report issued in corresponding European Application No. 20897363.6 on Nov. 28, 2023 (144 pages).

* cited by examiner

*Primary Examiner* — Viet D Vu
(74) *Attorney, Agent, or Firm* — Perkins Coie LLP

(57) ABSTRACT

In certain embodiments, intent prediction and dialogue generation may be facilitated. In some embodiments, a chat initiation request may be obtained from a user. The latest activity information associated with the user may be provided to a prediction model to obtain a first set of predicted intents of the user. For each intent of the first set of predicted intents, a candidate question may be selected from a question set based on the candidate question matching the intent. In some embodiments, the candidate questions may be simultaneously presented on the chat interface.

17 Claims, 8 Drawing Sheets

| CX | Channel | Cohort 1 20% of population | Cohort 2 20% of population | Cohort 3 30% of population |
|---|---|---|---|---|
| Card & card bank customers | Desktop web, mobile web, iOS, Android | ML 5 QRs shown in descending order of confidence | ML 5 QRs shown ascending order of confidence | ML 5 QRs shown in random order |
| Bank only customers | Desktop web, mobile web, iOS, Android | 4 QRs shown in random order + 1 QR for More Options | 5 QRs shown in random order | 5 QRs shown in random order |

FIG. 5

INTENT PREDICTION FOR DIALOGUE GENERATION

RELATED APPLICATION(S)

This application is a continuation of U.S. patent application Ser. No. 17/543,106, filed Dec. 6, 2021, which is a continuation of U.S. patent application Ser. No. 16/821,406, filed Mar. 17, 2020, which is a continuation of U.S. Ser. No. 16/821,008, filed Mar. 17, 2020, which claims the benefit of priority of U.S. Provisional Application No. 62/942,588, entitled "Pre-Chat Intent Prediction for Dialogue Generation," filed Dec. 2, 2019, which is hereby incorporated by reference herein in its entirety.

BACKGROUND OF THE INVENTION

Chatbots (e.g., a form of automated conversional artificial intelligence) enable a human user to message or chat with a computer that "talks" like a human and, in some instances, get answers without necessitating human interaction or independent searches by the user. For example, a chatbot may obtain context from the questions submitted by the user or answers (or other comments) provided by the user during a chat session and then propose solutions or answers to the user. Often, however, the user does not know what questions to ask the chatbot or how to phrase questions to the chatbot, which causes friction with respect to the user's interactions with a chatbot service.

SUMMARY OF THE INVENTION

Aspects of the invention relate to methods, apparatuses, and/or systems for facilitating intent prediction, dialogue generation based on such intent prediction, or training or configuration of neural networks or other prediction models to facilitate dialogue generation.

In some embodiments, a chat initiation request may be obtained from a user. The latest activity information associated with the user may be provided to a prediction model to obtain predicted intents of the user. For each intent of the current intents, a candidate question may be selected from a question set based on the candidate question matching the intent. In some embodiments, upon loading of the chat interface or within ten seconds of the chat initiation request, the candidate questions may be simultaneously presented on the chat interface. A user selection of a first question of the candidate questions may be obtained via the chat interface responsive to the presentation of the candidate questions. In this way, for example, the user is able to choose one or more of the presented questions to submit as the user's own question without needing to come up the question (or the phrasing of the question) or to understand how to phrase a question on the chat interface.

In some embodiments, based on the user selection and the first question matching a first intent of the predicted intents, the first intent may be provided as reference feedback for the prediction model. As an example, the first intent may be used to update one or more configurations of the prediction model (e.g., weights, biases, or other parameters of the prediction model). In this way, for example, the prediction model may be trained or configured to generate more accurate predictions.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 5 shows a chart indicating various presentation orderings for dialogue items, in accordance with one or more embodiments.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
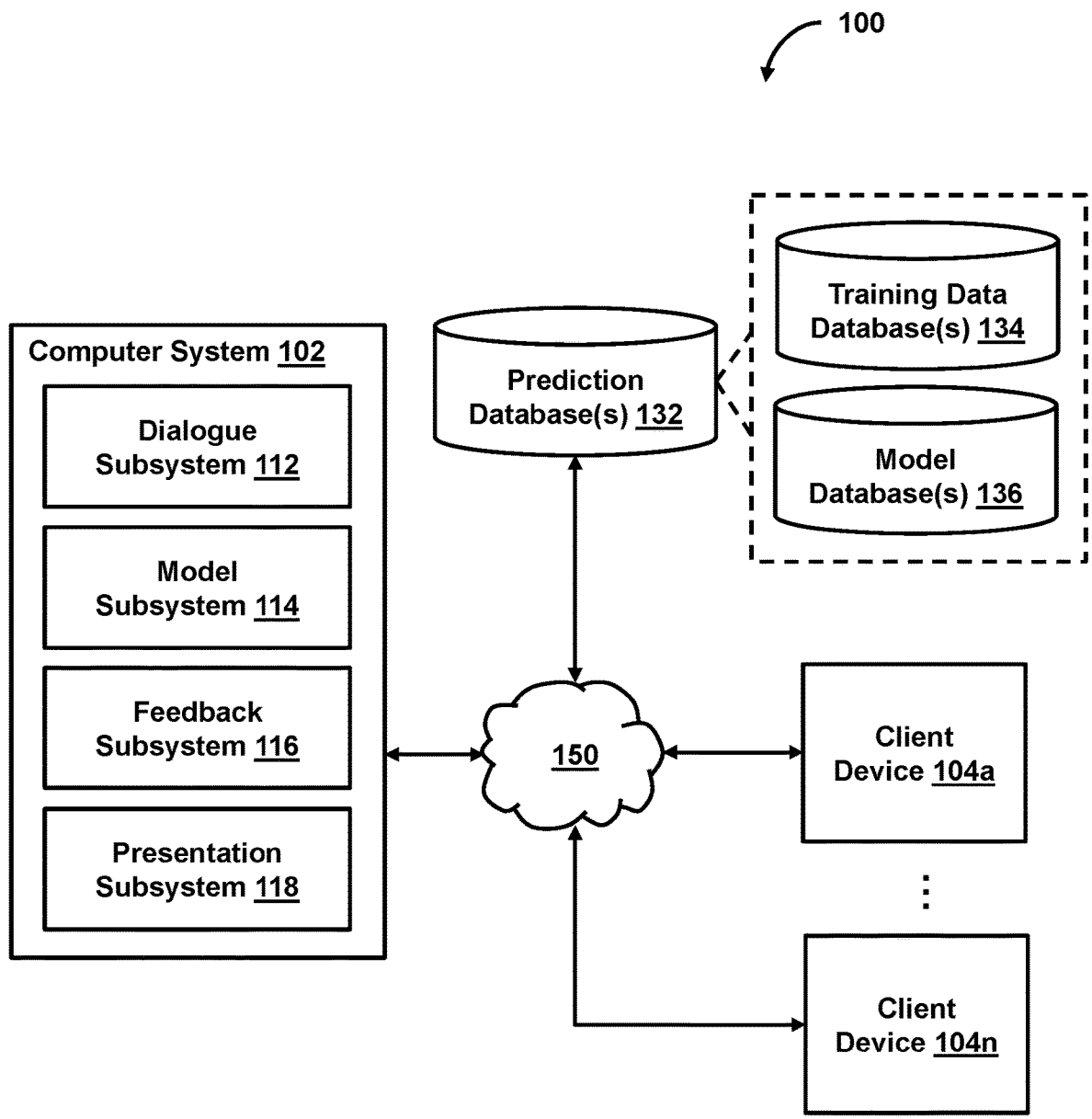
FIG. 1 shows a system for facilitating conversational artificial intelligence, in accordance with one or more embodiments.

FIG. 1 shows a system 100 for facilitating conversational artificial intelligence, in accordance with one or more embodiments. As shown in FIG. 1, system 100 may include computer system 102, client device 104 (or client devices 104a-104n), or other components. Computer system 102 may include dialogue subsystem 112, model subsystem 114, feedback subsystem 116, presentation subsystem 118, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 may facilitate a conversation with or assist a user via one or more prediction models. In some embodiments, system 100 may obtain one or more dialogue items via a prediction model and cause the dialogue items to be presented on a user interface. Responsive to obtaining a user response to the dialogue item presentation, system 100 may generate, based on the user response, a response to the user response and present the response on the user interface. In some embodiments, intent classification (e.g., automated association of text or actions to a specific goal or other intent) may be performed on user activity information to determine the dialogue items to be presented on the user interface. As an example, such intent classification may be performed via a neural network (e.g., where its last layer or other layer produces a probability distribution over classes), a Naive Bayes model, or one or more other prediction models.

In some embodiments, system 100 may obtain the dialogue items by providing user activity information associated with the user as input to the prediction model to obtain one or more predicted intents of the user (e.g., predicted goals or other intents of the user) and obtaining the dialogue items based on the predicted intents. As an example, the user activity information may be provided as input to the prediction model responsive to a chat initiation request from the user. As another example, the user activity information may be provided as input to the prediction model on a periodic basis, in accordance to a schedule, or based on one or more other automated triggers (e.g., upon login to a platform service or other action of the user) to obtain one or more outputs from the neural network (e.g., via which predicted intents coinciding with the chat initiation request are obtained). The user activity information may include page view information related to page views of the user (e.g., the latest page views or other page views of the user), service interaction information related to interactions of the user with one or more services (e.g., the latest interactions or other interactions of the user), transaction information related to transactions of the user (e.g., the latest transactions or other transactions of the user), or other user activity information (e.g., chat session information related to a current chat session or prior chat sessions with the user, information related to upcoming travel or other plans of the user, etc.).

In some embodiments, system 100 may obtain one or more predicted intents of a user via a prediction model (e.g., based on user activity information associated with the user) and generate one or more dialogue items for presentation on the chat interface based on the predicted intents. As an example, for each intent of the predicted intents, system 100 may generate a dialogue item based on the intent and present the dialogue items on the chat interface. In some embodiments, system 100 may select one or more dialogue items based on the predicted intents. As an example, for each intent of the predicted intents, system 100 may select a dialogue item from a dialogue item set based on the dialogue item matching the intent. As a further example, system 100 may obtain an intent set from the prediction model, where each intent of the intent set is associated with a probability of matching a current intent of the user. System 100 may then select the predicted intents from the intent set based on the predicted intents being associated with higher probabilities (e.g., higher confidence scores of matching a current intent of the user) than one or more other predicted intents of the intent set.

In some embodiments, system 100 may train or configure a prediction model to facilitate a conversation with or assist one or more users. In some embodiments, system 100 may obtain user activity information associated with a user (e.g., page view information, service interaction information, transaction information, or other user activity information) and provide such information as input to a prediction model to generate predictions (e.g., related to an intent of the user, such as a goal of the user, a question or statement that the user intends to submit, etc.). System 100 may provide reference feedback to the prediction model, and the prediction model may update one or more portions of the prediction model based on the predictions and the reference feedback. As an example, where the prediction model generates predictions based on user activity information coinciding with a given time period, one or more verified intents associated with such user activities may be provided as reference feedback to the prediction model. As an example, a particular goal may be verified as the user's intent (e.g., via user confirmation of the goal, via one or more subsequent actions demonstrating such goal, etc.) when the user was browsing one or more pages or taking one or more other actions via one or more services. The foregoing user activities may be provided as input to the prediction model to cause the prediction model to generate predictions of the user's intent, and the verified goal may be provided as reference feedback to the prediction model to update the prediction model. In this way, for example, the prediction model may be trained or configured to generate more accurate predictions.

In some embodiments, the foregoing operations for updating the prediction model may be performed with a training dataset with respect to one or more users (e.g., a training dataset associated with a given user to specifically train or configure the prediction model for the given user, a training dataset associated with a given cluster, demographic, or other group to specifically train or configure the prediction model for the given group, or other training dataset). As such, in some embodiments, subsequent to the updating of the prediction model, system 100 may use the prediction model to facilitate a conversation with or assist one or more users.

In some embodiments, the prediction model may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 2:
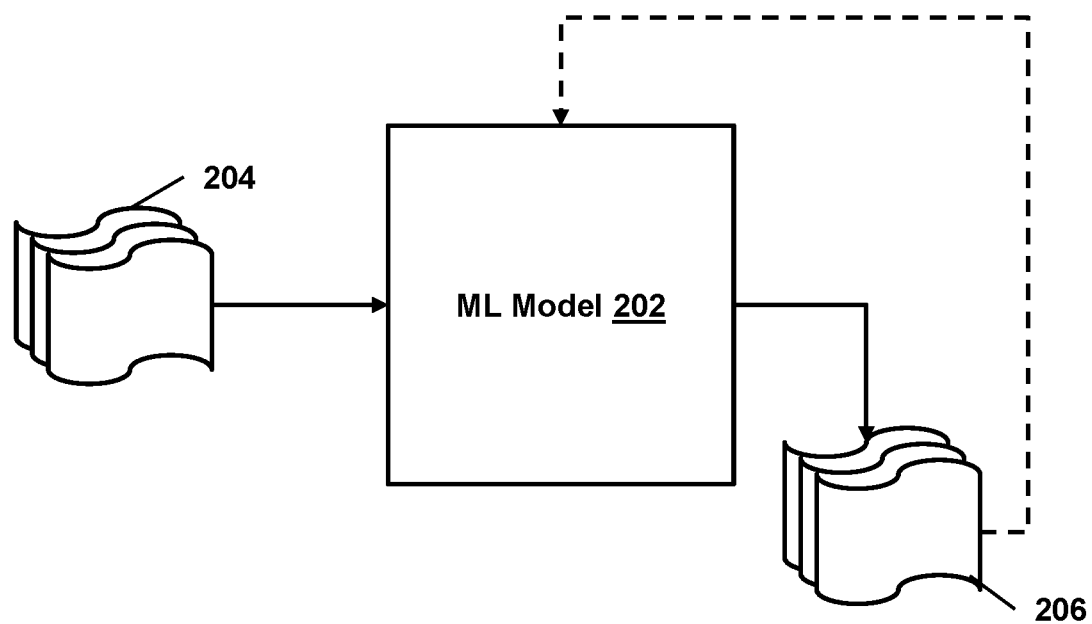
FIG. 2 shows a machine learning model configured to facilitate a conversation, in accordance with one or more embodiments.

As an example, with respect to FIG. 2, machine learning model 202 may take inputs 204 and provide outputs 206. In one use case, outputs 206 may be fed back to machine learning model 202 as input to train machine learning model 202 (e.g., alone or in conjunction with user indications of the accuracy of outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information). In another use case, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

Subsystems 112-118

In some embodiments, dialogue subsystem 112 may obtain one or more dialogue items via a prediction model, and presentation subsystem 118 may cause the dialogue items to be presented on a user interface for a user. Responsive to obtaining a user response to the dialogue item presentation, dialogue subsystem 112 may generate a response to the user response, and presentation subsystem 118 may cause the response to be presented on the user interface. In some embodiments, dialogue subsystem 112 may generate the response (e.g., an answer to a selected question, a confirmation of an action triggered based on a selected command, etc.) based on account information associated with the user (e.g., an account status or other account information).

As an example, if the user is interacting with the user interface of the user's mobile application, the account information may be obtained based on the user having been authenticated with the mobile application. As another example, the mobile application may be a financial services application for managing one or more accounts of the user, and the user's selection of one or more presented dialogue items (e.g., a question, a command, or other dialogue item) may affect servicing of the user's accounts. In one use case, if the dialogue item is a command to place a temporary hold on use of an account for new transactions, and the user selects the temporary hold command, the user may be presented with a confirmation prompt to confirm the temporary hold. Upon obtaining the user's confirmation, the temporary hold may be activated for any new transactions on the particular user account.

In some embodiments, model subsystem 114 may provide user activity information associated with a user as input to a prediction model to obtain one or more predicted intents of the user, and presentation subsystem 118 may cause one or more dialogue items (e.g., questions, statements, etc.) to be presented on a user interface (e.g., a chat interface) based on the predicted intents of the user. Additionally, or alternatively, account information or other information associated with the user may be provided as input to the prediction model to obtain the predicted intents. As an example, dialogue subsystem 112 may select the dialogue items for the presentation on the user interface based on the predicted intents. As a further example, for each intent of the predicted intents, a dialogue item may be selected from a dialogue item set based on the dialogue item matching the intent. The dialogue item set may include a predetermined set of questions or statements associated with the user, a predetermined set of questions or statements associated with a group (e.g., a similarity cluster to which the user is allocated, a demographic group to which the user is designated, or other group), or other predetermined dialogue item set. In one use case, for example, the dialogue item set may include dialogue items that are mapped to one or more intents, and a dialogue item may be selected for presentation to the customer based on the dialogue item being mapped to a predicted intent of the user.

Figure 3:
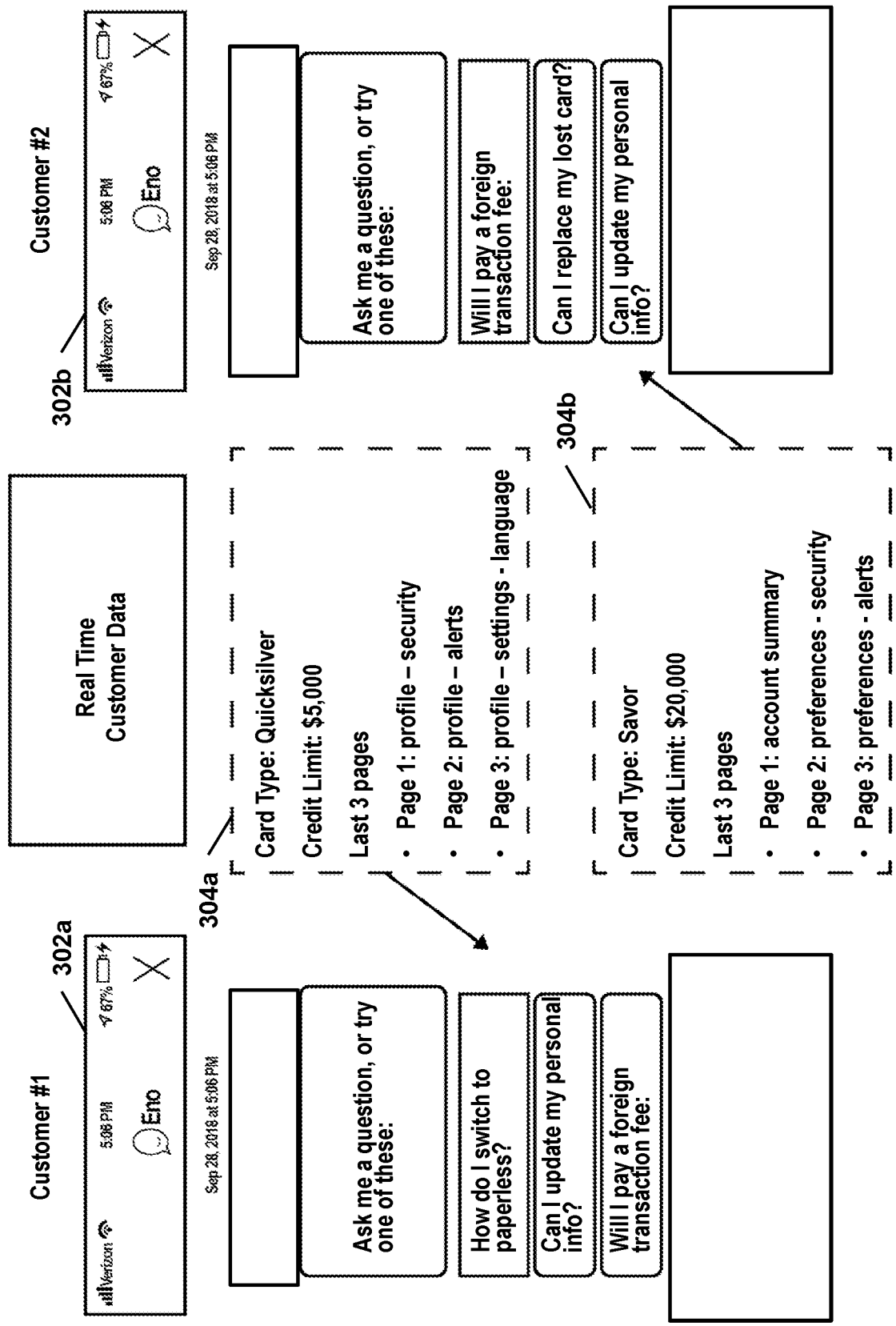
FIG. 3 shows chat interfaces with respective lists of selectable dialogue items, in accordance with one or more embodiments.

In some embodiments, the dialogue item set (from which one or more dialogue items may be selected for presentation to the user) may be determined based on account information (e.g., account type, credit limit, features available via the account, etc.) or other context information associated with the user (e.g., a date/time of a chat initiation request of the user, an operating system used by the user to access the chat session, latest activities of the user, etc.). As an example, as shown in FIG. 3, the selectable questions presented on chat interfaces 302a and 302b to first and second customers, respectively, are different from one another. In one use case, the selectable questions on each of the chat interfaces may be selected from a question set that is based on the particular customer's context information.

As an example, with respect to chat interface 302a, the selectable questions may be selected from a question set that is based the first customer's context information 304a indicating that (i) the first customer has a first type of credit card (e.g., "Quicksilver" card), and (ii) the card has a credit limit of five thousand dollars ($5,000). The question set may be additionally or alternatively determined based on the page view information indicating that the last three (3) pages that the first customer accessed was "profile-security," "profile-alerts," and "profile-settings-language." As another example, with respect to chat interface 302b, the selectable questions may be selected from a question set that is based the second customer's context information 304b indicating that (i) the second customer has a second type of credit card (e.g., "Savor" card), and (ii) the card has a credit limit of twenty thousand dollars ($20,000). The question set may be additionally or alternatively determined based on the page view information indicating that the last three (3) pages that the second customer accessed was "account summary," "preferences-security," and "preferences-alerts."

As discussed herein, the user activity information may include page view information related to page views of the user, service interaction information related to interactions of the user with one or more services, transaction information related to transactions of the user, or other user activity information. As an example, the page view information may indicate (i) labels assigned to pages accessed by the user (e.g., desktop web or mobile pages access by the user), (ii) labels assigned to sections or other portions of such accessed pages, (iii) title or other text of such accessed pages, (iv) frequencies of such accesses within a given time period, (v) summary information regarding such page accesses, or (vi) other page view information. The service interaction information may indicate (i) information submitted by the user to a service (e.g., search queries, scheduled event information, etc.), (ii) authentication attempts of the user (e.g., successful logins, login failures, etc.), (iii) dates/times of such interactions, (iv) summary information of such interactions, or (v) other service interaction information. The transaction information may indicate (i) transactions of the user, (ii) payment methods used in such transactions, (iii) transaction types of such transactions, (iv) products or services purchased via such transactions, (v) merchants with which such transactions took place, (vi) summary information regarding such transactions, such as a ranking of top merchants by number of transactions over a given time period, or (vii) other transaction information.

In some embodiments, model subsystem 114 may obtain an intent set from a prediction model (e.g., to which user activity information associated with a user was provided) and select one or more predicted intents from the intent set, and dialogue subsystem 112 may obtain one or more dialogue items for presentation on a user interface based on the predicted intents (e.g., by generating the dialogue items based on the predicted intents, by selecting the dialogue items from a dialogue item set based on the predicted intents, etc.). As an example, for each predicted intent of the intent set, the prediction model may generate a probability of matching a current intent of the user. In one use case, the predicted intents may be selected from the intent set based on a determination that the probabilities of the predicted intents are greater than or equal to the probabilities of one or more other predicted intents of the intent set. Additionally, or alternatively, the predicted intents may be selected from the intent set based on a determination that the probabilities of the predicted intents satisfy one or more probability thresholds (e.g., greater than or equal to a minimum confidence score threshold).

In some embodiments, where a predicted intent is associated with a confidence score or other probability, and a dialogue item is obtained for presentation on a user interface based on the predicted intent, presentation subsystem 118 may determine a presentation order for the dialogue items based on the associated probabilities and cause the dialogue items to be presented in accordance with the presentation order. As an example, with respect to FIG. 5, if the predetermined number of questions (e.g., "Quick Replies" (QR)) to be presented as a list on the user interface is five questions, and the presentation order corresponds to a descending order of confidence, the list of five questions may be presented on the user interface in descending order with respect to their corresponding intents' confidence scores. On the other hand, as another example, if the presentation order corresponds to an ascending order of confidence, the list of five questions may be presented on the user interface in ascending order with respect to their corresponding intents' confidence scores. In some embodiments, when user selections of presented dialogue items are used to train or configure a prediction model for a population or group, the basis on which the presentation order is determined may be varied for different portions of the population or group to reduce potential selection bias related to the ordering of the presented dialogue items. As indicated in FIG. 5, for example, at least some individuals of a population may be shown five questions in descending order of confidence, at least some individuals of the population may be shown five questions in ascending order of confidence, etc.

In some embodiments, the presentation order for the dialogue items may additionally or alternatively be based on one or more other criteria. As an example, with respect to FIG. 5, the presentation order may be randomly generated order. In some embodiments, such randomization may be a pseudo-randomization (e.g., by executing one or more RdRand instructions and applying one or more seed values or via other randomization techniques to randomly generate the noise data). As an example, the presentation order may be determined based on such randomization when user selections of presented dialogue items are used to train or configure a prediction model for a population or group to reduce potential selection bias related to the ordering of the presented dialogue items.

In some embodiments, presentation subsystem 118 may cause a first subset of dialogue items to be presented on a user interface, where at least one of the dialogue items is a selectable dialogue item that enables presentation of a second subset of dialogue items (e.g., "More Options" mechanism that, when activated, triggers presentation of the second subset). As an example, the first subset of dialogue items may include the following dialogue items: (i) "How do I activate my new card?", (ii) "Can I replace my lost card?", (iii) "Can I increase my credit limit?", (iv) "What's my reward balance?", (v) "Will I pay a foreign transaction fee?", and (vi) "More Options". In one use case, when "More Options" is selected by a user, one or more additional selectable questions may be presented after the foregoing first subset of questions (e.g., to show such additional options together with the first subset of questions). In another use case, when "More Options" is selected by the user, the additional selectable questions may be presented before the foregoing first subset of questions or presented such that the additional selectable questions are interlaced between the first subset of questions. In another use case, when "More Options" is selected by the user, the additional selectable questions may be presented in lieu of the first subset of questions such that the additional selectable questions replaces the first subset of questions on the user interface (e.g., to reduce the amount of interface space utilized by the presented selectable questions). In a further use case, the "More Options" mechanism may be maintained after additional selectable questions are presented on the user interface to enable the user to trigger presentation of one or more additional subsets of questions (or other dialogue items) on the user interface.

In some embodiments, where at least one of the dialogue items (of a first subset of dialogue items presented to a user) is a selectable dialogue item that enables presentation of a second subset of dialogue items, the additional dialogue items (of the second subset) may be obtained based on one or more predicted intents of the user. As an example, where the dialogue items of the first subset are obtained based on a first subset of predicted intents (from a prediction model), the additional dialogue items of the second subset may be obtained based on a second subset of predicted intents. As an example, dialogue subsystem 112 may select the additional dialogue items for the presentation on the user interface based on the additional predicted intents. As a further example, for each intent of the additional predicted intents, a dialogue item may be selected from a dialogue item set based on the dialogue item matching the intent.

In some embodiments, the additional predicted intents (e.g., on which selection of the additional dialogue items are based) may be selected from an intent set obtained from a prediction model. As an example, for each predicted intent of the intent set, the prediction model may generate a probability of matching a current intent of the user. In one use case, the additional predicted intents may be selected from the intent set based on a determination that the probabilities of the additional predicted intents are greater than or equal to the probabilities of one or more other remaining predicted intents of the intent set (e.g., predicted intents that remain after the first subset of predicted intents were selected). Additionally, or alternatively, the additional predicted intents may be selected from the intent set based on a determination that the probabilities of the additional predicted intents satisfy one or more probability thresholds (e.g., greater than or equal to a minimum confidence score threshold).

In some embodiments, one or more categories may be determined for one or more predicted intents of a user, and the predicted intents may be used to present one or more dialogue items based on the categories associated with the predicted intents. As an example, such categories may include topics related to the predicted intents, tiers in which probabilities of the predicted intents resides, or other categories. In some embodiments, the predicted intents may be assigned to one or more intent sets (or subsets) based on the categories associated with the predicted intents. As an example, at least some predicted intents may be assigned to a first set of predicted intents based on similarities between the categories associated with the predicted intents of the first set, at least some predicted intents may be assigned to a second set of predicted intents based on similarities between the categories associated with the predicted intents of the second set, at least some predicted intents may be assigned to a third set of predicted intents based on similarities between the categories associated with the predicted intents of the third set, and so on. In one use case, for example, the predicted intents may be assigned such that (i) the first set of predicted intents includes predicted intents associated with probabilities (e.g., confidence scores or other probabilities) in a first tier (e.g., first score tier or other tier), (ii) the second set of predicted intents includes predicted intents associated with probabilities in a second tier (e.g., second score tier or other tier), (iii) the third set of predicted intents includes predicted intents associated with probabilities in a third tier (e.g., third score tier or other tier), and so on.

As another example, at least some predicted intents may be assigned to a first set of predicted intents based on differences between the categories associated with the predicted intents of the first set, at least some predicted intents may be assigned to a second set of predicted intents based on differences between the categories associated with the predicted intents of the second set, at least some predicted intents may be assigned to a third set of predicted intents based on differences between the categories associated with the predicted intents of the third set, and so on. In one use case, for example, the predicted intents may be assigned such that (i) the first set of predicted intents includes two or more predicted intents that are each associated with a probability (e.g., confidence score or other probability) in a tier (e.g., score tier or other tier) different from a probability associated with another one of the predicted intents of the first set, (ii) the second set of predicted intents includes two or more predicted intents that are each associated with a probability in a different one of the tiers (to which the probabilities associated with the predicted intents of the first set respectively correspond), (iii) the third set of predicted intents two or more predicted intents that are each associated with a probability in a different one of the tiers, (iv) etc.

In a further use case, among five tiers, the tiers may respectively include (i) confidence scores in the highest 20% of scores associated with the predicted intents (e.g., confidence scores associated with the predictions of a user's current intent), (ii) confidence scores in the next highest 20% of such scores, (iii) confidence scores in the middle 20% of such scores, (iv) confidence scores in the second-lowest 20% of such scores, and (v) confidence scores in the lowest 20% of such scores. As an example, among predicted intents with confidence scores between 49% and 98.9%, the first set of predicted intents may include predicted intents with confidence scores between 89% to 98.9%, the second set of predicted intents may include predicted intents with confidence scores between 79% to 88.9%, the third set of predicted intents may include predicted intents with confidence scores between 69% to 78.9%, the fourth set of predicted intents may include predicted intents with confidence scores between 59% to 68.9%, and the fifth set of predicted intents may include predicted intents with confidence scores between 49% to 58.9%.

In some embodiments, model subsystem 114 may obtain one or more predicted intents of a user via a prediction model (e.g., based on user activity information associated with the user), and dialogue subsystem 112 may obtain one or more dialogue items for presentation to the user based on the predicted intents. In some embodiments, model subsystem 114 may obtain predicted intents from the prediction model and assign the predicted intents to one or more intent sets (or subsets) based on categories associated with the predicted intents. Dialogue subsystem 112 may use a first set of predicted intents (from the intent sets) to obtain one or more dialogue items for presentation to the user. As an example, for each intent of the first set of predicted intents, dialogue subsystem 112 may generate a dialogue item based on the intent or select the dialogue item from a dialogue item set based on the dialogue item matching the intent. As indicated above, in one use case, the first set of predicted intents may include an intent with a confidence score in a first tier (e.g., the highest confidence score in such tier, a random confidence score in such tier, etc.), an intent with a confidence score in a second tier, an intent with a confidence score in a third tier, an intent with a confidence score in a fourth tier, and an intent with a confidence score in a fifth tier. For each of the foregoing intents of the first set, a dialogue item matching the intent may be obtained and presented to the user.

In some embodiments, dialogue subsystem 112 may obtain a request from a user to initiate a chat session. Responsive to the request, dialogue subsystem 112 may initiate the chat session, and presentation subsystem 118 may provide a chat interface for presentation to the user. In some embodiments, responsive to the request, dialogue subsystem 112 may trigger model subsystem 114 to obtain user activity information associated with the user (e.g., related to the user's latest activities prior to the chat initiation request or to other activities of the user) and provide the user activity information to a prediction model to obtain one or more predicted intents of the user. Based on the predicted intents of the user, dialogue subsystem 112 may obtain one or more dialogue items for the presentation on the chat interface. In some embodiments, the dialogue items may be presented on the chat interface upon the loading of the chat interface or within a short period of time of the chat initiation request (e.g., within one second of the chat initiation request, within five seconds of the chat initiation request, within ten seconds of the chat initiation request, within twenty seconds of the chat initiation request, etc.). In this way, for example, the dialogue items may be presented on the chat interface without the user providing any user input specifically requesting the dialogue items, without the user providing any user input in the chat interface (e.g., without the user having to ask any questions or provide answers to questions in the chat interface), etc.

Figure 4:
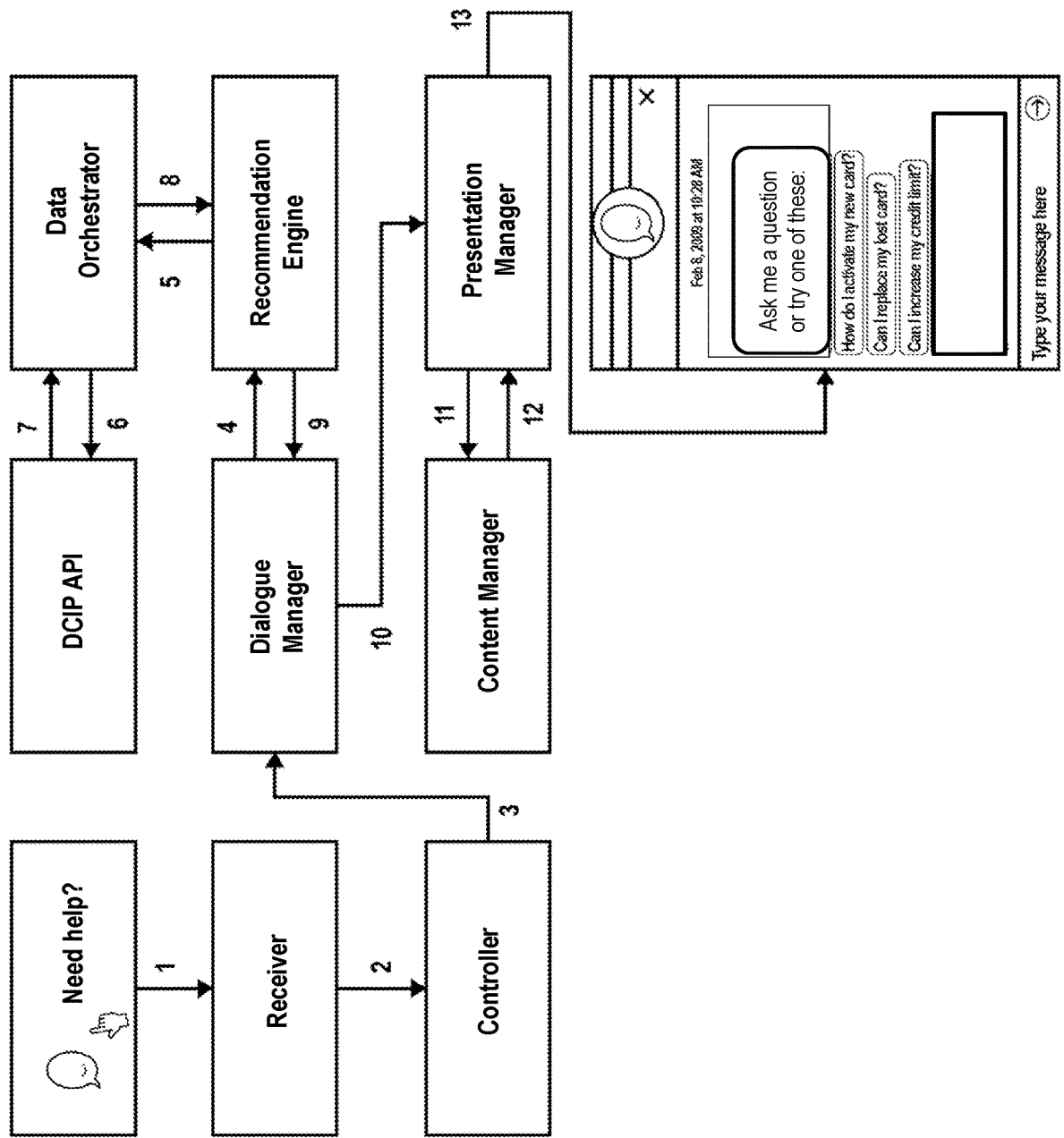
FIG. 4 shows components of a personal assistance platform and their interactions with one another, in accordance with one or more embodiments.

In one use case, with respect to FIG. 4, a customer may click on, for example, a chat-buddy icon, a chat interface button, or a "Need Help?" button on a mobile application interface, a desktop web interface, or other interface, which may initiate a session involving one or more components of a personal assistance platform by sending a request (e.g., a chat initiation request) to a receiver of the personal assistance platform. The receiver may send a launch request to a controller of the personal assistance platform. In some embodiments, the user may already be authenticated in a mobile authentication or a website account, and the controller may then retrieve and send initial customer information associated with the customer to a dialogue manager of the personal assistance platform. In some embodiments, the controller may retrieve and send the initial customer information associated with the customer to the dialogue manager responsive to authenticating the user (e.g., without waiting for a customer to initiate a chat session) to initiate pre-generation of one or more selectable questions in anticipation of a user requesting to initiate a chat session. Such initial customer information may include (i) types of accounts the customer has with one or more entities associated with the personal assistance platform (e.g., checking accounts, savings accounts, or other account types), (ii) attributes or other details associated with such accounts, (iii) preference information (e.g., default preferences, user-designated preferences, etc.), or (iv) other customer information. The dialogue manager may request a predetermined number of questions from a recommendation engine of the personal assistance platform. In doing so, for example, the dialogue manager may provide at least some of the initial customer information or other details (e.g., information that the dialogue manager derived from the initial customer information) to the recommendation engine. The recommendation engine may call a data orchestrator of the personal assistance platform to obtain the customer activity information associated with the customer (e.g., page view information, service interaction information, transaction information, etc.). As an example, the data orchestrator may call a DCPI API (Data Center Physical Infrastructure application programming interface) to obtain page view information associated with the customer. Upon retrieval, the DCPI API may return the page view information (e.g., the latest page views of the customer) to the data orchestrator. The data orchestrator may then return the customer activity information to the recommendation engine.

Still with respect to FIG. 4, the recommendation engine may run a machine learning model with the customer activity information (e.g., pre-chat customer activity information) to obtain one or more predicted intents of the customer (e.g., a predetermined number of predicted intents). As an example, the recommendation engine may provide the customer activity information as input to the machine learning model to cause the machine learning model to generate the predicted intents. Upon obtaining the predicted intents, the recommendation engine may provide the predicted intents to the dialogue manager, and the dialogue manager may forward the predicted intents to a presentation manager of the personal assistance platform. The presentation manager may then call a content manager of the personal assistance platform to translate the predicted intents into questions that are to be presented on the chat interface as selectable questions. When the content manager sends the questions to the presentation manager, the presentation manager may cause a welcome message and the questions to be presented on the chat interface (e.g., by sending the welcome message and questions to the appropriate chat interface manager). In one use case, as shown in FIG. 4, the welcome message may include "Hi there! I'm Eno, your Capital One assistant. I'm new, so I typically respond best to short requests. Ask me a question, or try one of these" and the questions may include: (i) "How do I activate my new card?", (ii) "Can I replace my lost card?", (iii) "Can I increase my credit limit?", (iv) "What's my reward balance?", and (v) "Will I pay a foreign transaction fee?". In some embodiments, where the selectable questions are pre-generated in anticipation of a user requesting to initiate a chat session, the presentation manager may retain the one or more selectable questions for a predetermined duration and then cause the questions to be presented upon a user request to initiate a chat session.

In some embodiments, dialogue subsystem 112 may obtain one or more dialogue items via a prediction model, and presentation subsystem 118 may cause the dialogue items to be presented automatically on a user interface for a user (e.g., without any user input from the user that specifically requests the dialogue items, without any user input from the user that specifically requests initiation of a chat session, etc.). As an example, prior to obtaining a chat initiation request from the user, the dialogue items may be presented on the user interface (e.g., in a sub-window of the user interface). In one use case, the user may select at least one of the dialogue items (or a chat interface icon or other mechanism) to initiate a chat session and cause a chat interface to be presented to the user. In a further use case, upon such user selection, one or more of the dialogue items (e.g., the selected dialogue item and/or the other dialogue items) may be presented in the chat interface. Additionally, or alternatively, a response to the selected dialogue item (e.g., a response to a selected question) may be generated and presented on the chat interface.

In some embodiments, where a predicted intent is associated with a confidence score or other probability, and a dialogue item is obtained for presentation on a user interface for a user based on the predicted intent, presentation subsystem 118 may cause the dialogue item to be presented on a user interface based on the probability associated with the predicted item (to which the dialogue item corresponds) such that the dialogue item is automatically presented on the user interface prior to the user initiating a chat session (e.g., without any user input from the user that specifically requests the dialogue item, without any user input from the user that specifically requests initiation of a chat session, etc.). In one use case, one or more dialogue items may be presented based on a determination that the probabilities of the corresponding predicted intents are greater than or equal to the probabilities of one or more other predicted intents of an intent set. Additionally, or alternatively, the dialogue items may be presented based on a determination that the probabilities of the corresponding predicted intents satisfy one or more probability thresholds (e.g., greater than or equal to a confidence score threshold for presentation on the user interface prior to the user initiating a chat session). As an example, if a confidence score related to a question (or other dialogue item) is high enough, the question may be automatically presented on the user interface (e.g., in a sub-window of the user interface) prior to the user submitting a request for a chat session. Upon selecting the presented question, a chat interface may be loaded, and the question and a response to the question may be presented on the chat interface.

In some embodiments, model subsystem 114 may train or configure a prediction model to facilitate a conversation with or assist one or more users. In some embodiments, model subsystem 114 may obtain page view information, service interaction information, transaction information, or other user activity information associated with a user and provide such information as input to a prediction model to generate predictions (e.g., related to an intent of the user, such as a goal of the user, a question or statement that the user intends to submit, etc.). Additionally, or alternatively, account information or other information associated with the user may be provided as input to the prediction model to generate such predictions. Feedback subsystem 116 may provide reference feedback to the prediction model, and the prediction model may update one or more portions of the prediction model based on the predictions and the reference feedback. In one use case, where the prediction model includes a neural network, the neural network may assess its predictions (e.g., its predicted intents, their associated confidence scores, or other probabilities, etc.) against the reference feedback (e.g., verified intents). The neural network may then update its weights, biases, or other parameters based on the prediction assessment. In some embodiments, the foregoing operations for updating the prediction model may be performed with a training dataset with respect to one or more users (e.g., a training dataset associated with a given user to specifically train or configure the prediction model for the given user, a training dataset associated with a given cluster, demographic, or other group to specifically train or configure the prediction model for the given group, or other training dataset).

As an example, where the prediction model generates predictions based on user activity information coinciding with a given time period, one or more verified intents associated with such user activities may be provided as reference feedback to the prediction model. In one use case, a particular goal may be verified as the user's intent (e.g., via user confirmation of the goal, via one or more subsequent actions demonstrating such goal, etc.) when the user was browsing one or more pages or taking one or more other actions via one or more services. The foregoing user activities may be provided as input to the prediction model to cause the prediction model to generate predictions of the user's intent, and the verified goal may be provided as reference feedback to the prediction model to update the prediction model. In this way, for example, the prediction model may be trained or configured to generate more accurate predictions.

In some embodiments, presentation subsystem 118 may cause one or more dialogue items (e.g., questions, statements, etc.) to be presented on a user interface based on one or more predicted intents of a user (e.g., provided via a prediction model), and dialogue subsystem 112 may obtain a user selection of a first dialogue item (of the dialogue items) via the user interface. Based on the user selection and the first dialogue item corresponding to a first intent (of the predicted intents) (e.g., the first dialogue matches the first intent), feedback subsystem 116 may use the first intent to update one or more configurations of the prediction model (e.g., one or more weights, biases, or other parameters of the prediction model). In one use case, feedback subsystem 116 may provide the first intent as reference feedback to the prediction model, and, in response, the prediction model may assess its predicted intents (and/or their associated probabilities) against the first intent (and/or its associated probabilities). Based on its assessment, the prediction model may update one or more weights, biases, or other parameters of the prediction model. In this way, for example, the user selection of the presented dialogue items may be used to further train or configure the prediction model (e.g., specifically for the user, specifically for a group associated with the user, etc.).

In some embodiments, where the user does not select a presented dialogue item (or selects a dialogue item indicating that none of the dialogue item corresponds to the user's current intent, e.g., "None of these") or provides a different response (e.g., a user input string different from the presented dialogue items), the foregoing response (or lack thereof) may be used to update one or more portions of the prediction model, an intent set from which one or more intents is to be predicted, or a dialogue item set from which one or more dialogue items may be selected. As an example, when the user selects none of the presented dialogue items (derived from a predicted intent) and provides a natural language input (e.g., a question or statement formulated by the user), dialogue subsystem 112 may perform natural language processing on the natural language input. Based on the natural language processing, dialogue subsystem 112 may determine one or more intents associated with the natural language input or one or more dialogue items to be added to the dialogue item set. In one use case, for example, the intent set or the dialogue item set may be subsets of larger collection of potential intents and dialogue items, and the intent set or the dialogue item sets may be updated based on the user's responses so that the correct dialogue item(s) may be presented when the user returns in the same or substantially similar circumstance.

In some embodiments, where the user selects a presented dialogue item corresponding to a predicted intent (e.g., obtained from a prediction model), feedback subsystem 116 may determine a feedback score associated with the predicted intent (e.g., based on the user selecting the corresponding dialogue item) and use the feedback score to update one or more configurations of the prediction model (e.g., one or more weights, biases, or other parameters of the prediction model). In one use case, feedback subsystem 116 may provide the feedback score as reference feedback to the prediction model, and, in response, the prediction model may assess its predicted intents (and/or their associated probabilities) based on the feedback score. Based on its assessment, the prediction model may update one or more weights, biases, or other parameters of the prediction model.

In some embodiments, feedback subsystem 116 may determine the feedback score for the predicted intent based on a probability associated with the predicted intent, a category associated with the predicted intent, or other criteria. As an example, the feedback score may be a confidence score associated with the predicted intent, or the feedback score may be calculated based on the confidence score. As another example, where the predicted intent is associated with a probability (e.g., a confidence score or other probability) in a given tier, feedback subsystem 116 may determine the feedback score based on the tier in which the probability of the predicted intent resides.

As indicated above, in one use case, a first set of predicted intents may include an intent with a confidence score in a first tier (e.g., the highest confidence score in such tier, a random confidence score in such tier, etc.), an intent with a confidence score in a second tier, an intent with a confidence score in a third tier, an intent with a confidence score in a fourth tier, and an intent with a confidence score in a fifth tier. In a further use case, among five tiers, the tiers may respectively include (i) confidence scores in the highest 20% of scores associated with the predicted intents (e.g., confidence scores associated with the predictions of a user's current intent), (ii) confidence scores in the next highest 20% of such scores, (iii) confidence scores in the middle 20% of such scores, (iv) confidence scores in the second-lowest 20% of such scores, and (v) confidence scores in the lowest 20% of such scores. In other use cases, other distribution of such scores (e.g., percentages different from the foregoing use case, varying percentages for one or more of such tiers, etc.) may be used. For each of the foregoing intents of the first set, a dialogue item matching the intent may be obtained and presented to the user. Responsive to the user selecting a presented dialogue item, the feedback score associated with the matching predicted intent may be used to update the prediction model. In this way, for example, rather than simply presenting dialogue items matching the highest overall confidence scores (or the predicted intents having such confidence scores), the feedback score corresponding to the appropriate tier may be used to train or update the prediction model.

Example Flowchart(s)

The example flowchart(s) described herein of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 6:
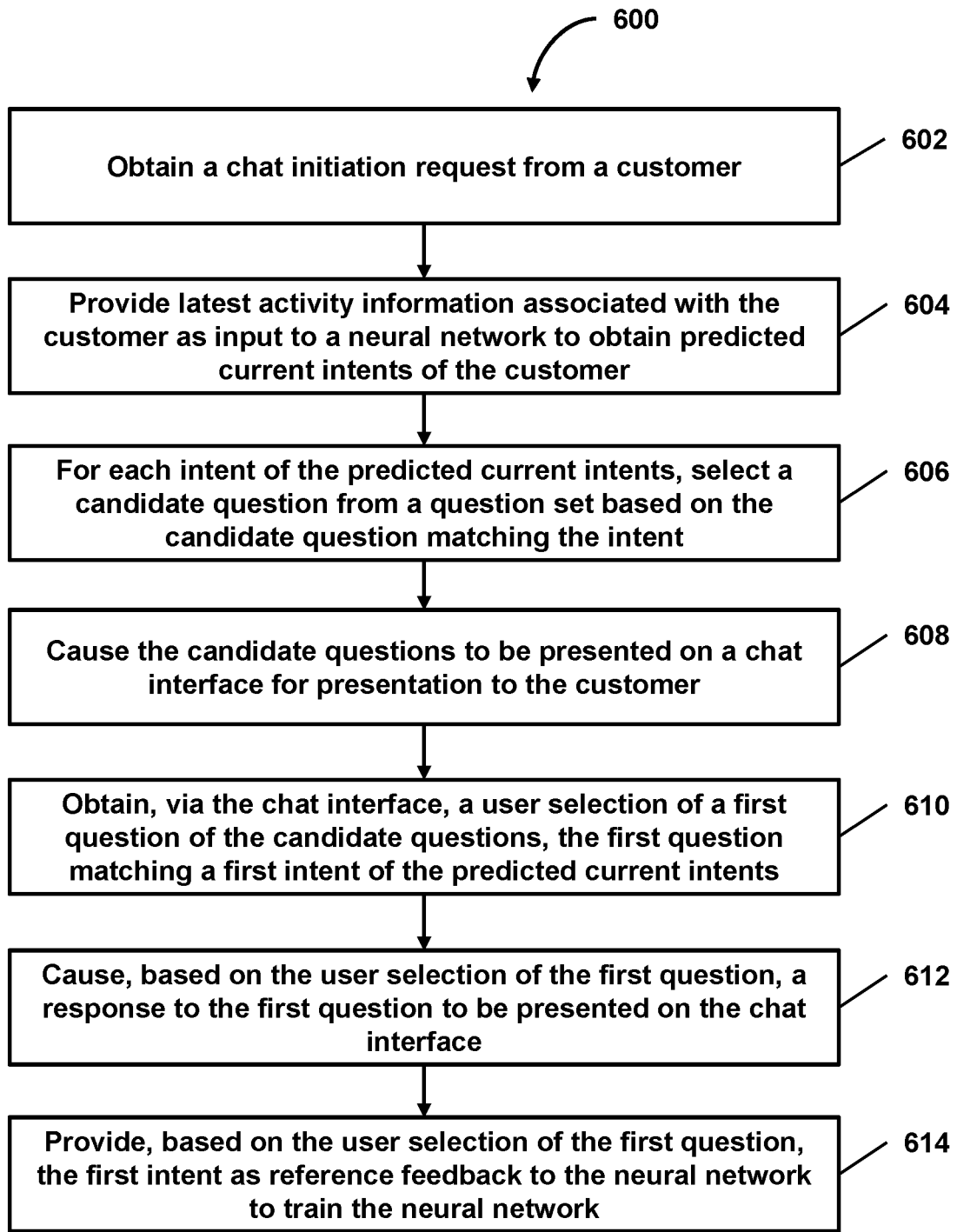
FIG. 6 shows a flowchart of a method of facilitating pre-chat intent prediction and dialogue generation based on such intent prediction, in accordance with one or more embodiments.

FIG. 6 shows a flowchart of a method 600 of facilitating chat dialogue via pre-chat customer intent, in accordance with one or more embodiments. In an operation 602, a chat initiation request may be obtained from a customer. As an example, upon obtaining the chat initiation request, a chat session may be initiated, and a chat interface may be provided for presentation to the customer. Operation 602 may be performed by a subsystem that is the same as or similar to dialogue subsystem 112, in accordance with one or more embodiments.

In an operation 604, latest activity information associated with the customer may be provided as input to a neural network to obtain predicted current intents of the customer. As an example, the latest activity information may be provided as input to the neural network responsive to the chat initiation request. As another example, the latest activity information may be provided as input to the neural network on a periodic basis, in accordance with a schedule, or based on one or more other automated triggers to obtain one or more outputs from the neural network (e.g., via which predicted intents coinciding with the chat initiation request are obtained). The latest activity information may include page view information related to recent page views of the customer, service interaction information related to recent interactions of the customer with one or more services, transaction information related to recent transactions of the customer, or other activity information associated with the customer. Operation 604 may be performed by a subsystem that is the same as or similar to model subsystem 114, in accordance with one or more embodiments.

In an operation 606, for each intent of the predicted current intents, a candidate question may be selected from a question set based on the candidate question matching the intent. As an example, the question set may include questions that are mapped to one or more intents, and a question may be selected for presentation to the customer based on the question being mapped to a predicted current intent of the customer. Operation 606 may be performed by a subsystem that is the same as or similar to dialogue subsystem 112, in accordance with one or more embodiments.

In an operation 608, the candidate questions may be presented on the chat interface. As an example, within ten seconds (or three seconds or even less) of the chat initiation request, the candidate questions may be simultaneously presented on the chat interface. Operation 608 may be performed by a subsystem that is the same as or similar to presentation subsystem 118, in accordance with one or more embodiments.

In an operation 610, a user selection of a first question of the candidate questions may be obtained via the chat interface, where the first question matches a first intent of the predicted current intents. As an example, upon the candidate questions being presented via the chat interface, the customer may select one of the presented questions or submit another question via the chat interface, and the customer's actions may be obtained as the customer response in the chat interface. Operation 610 may be performed by a subsystem that is the same as or similar to dialogue subsystem 112, in accordance with one or more embodiments.

In an operation 612, based on the user selection of the first question, a response to the first question may be presented on the chat interface. As an example, one or more answers may be mapped to each candidate question of the question set. Upon selection of the first question, at least one answer mapped to the first question may be selected and presented as a response to the user's question. Operation 612 may be performed by a subsystem that is the same as or similar to presentation subsystem 118, in accordance with one or more embodiments.

In an operation 614, based on the user selection of the first question, the first intent may be provided as reference feedback to the neural network to train the neural network. As an example, the neural network may update one or more configurations of the neural network (e.g., weights, biases, or other parameters of the neural network) based on the first intent. As a further example, the neural network may assess its predictions (e.g., the predicted current intents and their associated confidence scores) against the selected first intent and its associated confidence score (e.g., probability that the predicted first intent reflects a current intent of the customer). The neural network may then update its weights, biases, or other parameters based on the prediction assessment. Operation 614 may be performed by a subsystem that is the same as or similar to feedback subsystem 116, in accordance with one or more embodiments.

Figure 7:
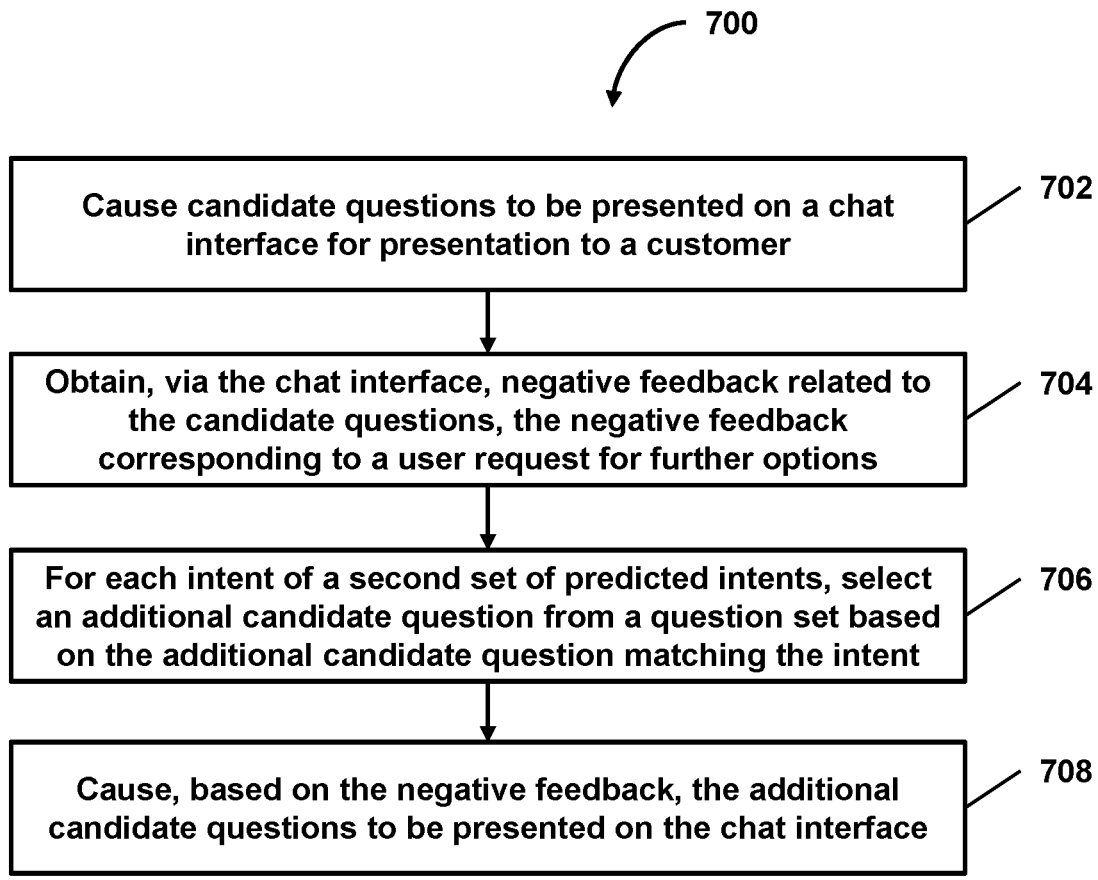
FIG. 7 shows a flowchart of a method of providing additional dialogue items in response to negative feedback related to presented dialogue items, in accordance with one or more embodiments.

FIG. 7 shows a flowchart of a method 700 of providing additional dialogue items in response to negative feedback related to presented dialogue items, in accordance with one or more embodiments. In an operation 702, one or more candidate questions may be presented on a chat interface to a customer. As an example, the candidate questions may be provided for presentation on the chat interface based on each of the candidate questions matching at least one predicted intent of a first set of predicted intents (e.g., obtained from a neural network responsive to providing the neural network with latest activity information associated with the customer). Operation 702 may be performed by a subsystem that is the same as or similar to presentation subsystem 118, in accordance with one or more embodiments.

In an operation 704, negative feedback related to the candidate questions may be obtained via the chat interface. As an example, the negative feedback may correspond to a user request for further options. In one use case, upon being presented with the candidate questions, the customer may select a "More Options" mechanism, thereby indicating that the candidate questions do not match the customer's current intent. Operation 704 may be performed by a subsystem that is the same as or similar to dialogue subsystem 112, in accordance with one or more embodiments.

In an operation 706, for each intent of a second set of predicted intents, an additional candidate question may be selected from a question set based on the additional candidate question matching the intent. As an example, the candidate questions that are initially presented to the customer may have been initially selected for presentation to the customer based on the initial candidate questions matching the intents of a first set of predicted intents. Responsive to the negative feedback (e.g., indicating that the initial candidate questions do not match the current intent of the customer), the second set of predicted intents may be used to select the additional candidate questions from the question set for presentation to the customer. As a further example, the question set may include questions that are mapped to one or more intents, and a question may be selected for presentation to the customer based on the question being mapped to a predicted intent of the customer. Operation 706 may be performed by a subsystem that is the same as or similar to dialogue subsystem 112, in accordance with one or more embodiments.

In an operation 708, based on the negative feedback, the additional candidate questions may be presented on the chat interface for presentation to the customer. Operation 708 may be performed by a subsystem that is the same as or similar to presentation subsystem 118, in accordance with one or more embodiments.

Figure 8:
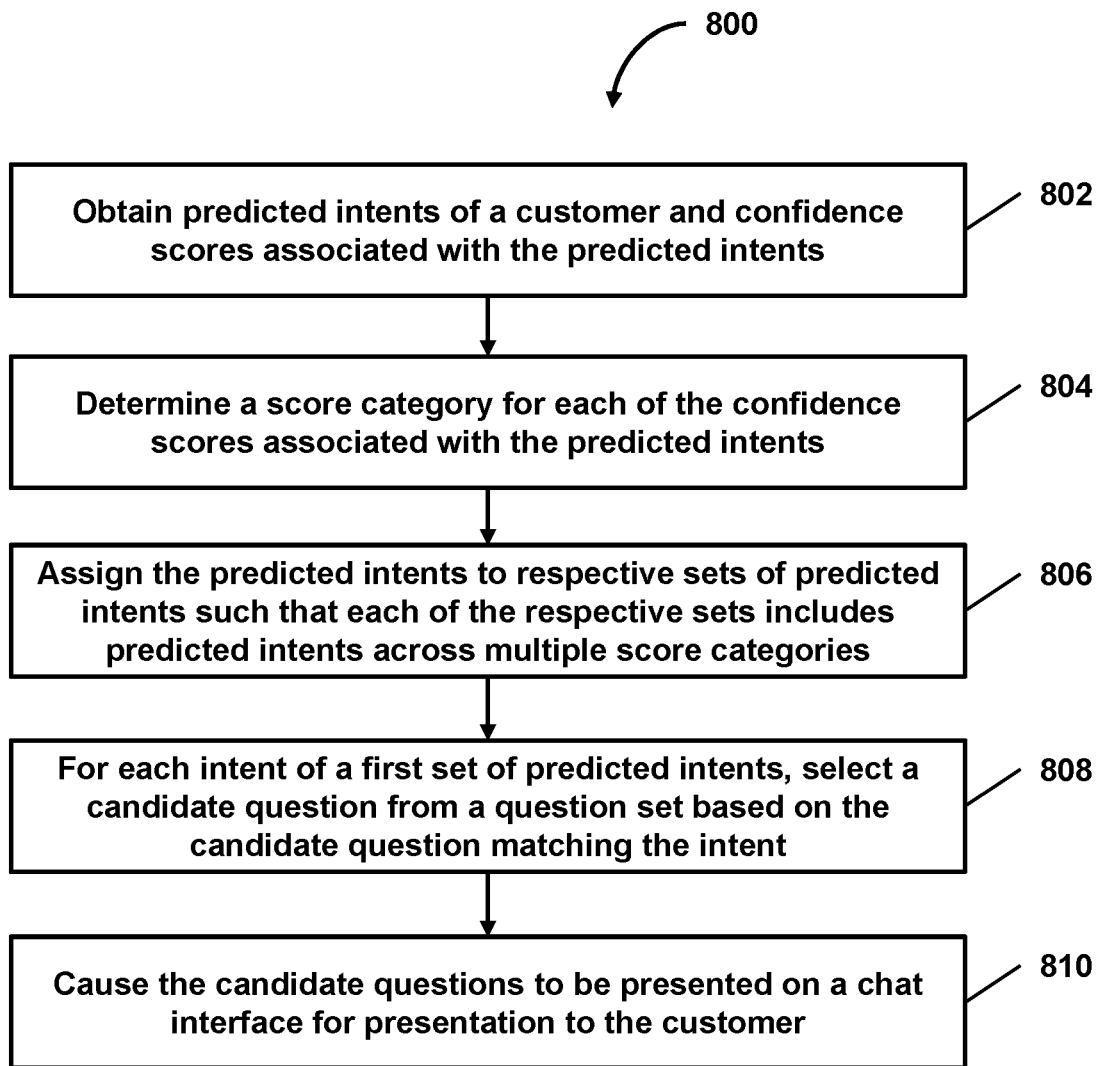
FIG. 8 shows a flowchart of a method of generating category-based sets of predicted intents to facilitate dialogue generation, in accordance with one or more embodiments.

FIG. 8 shows a flowchart of a method 800 of generating category-based sets of predicted intents to facilitate dialogue generation, in accordance with one or more embodiments. In an operation 802, predicted intents of a customer and confidence scores associated with the predicted intents may be obtained. As an example, latest activity information associated with the customer may be provided as input to a neural network to obtain the predicted intents of the customer. The latest activity information may include page view information related to recent page views of the customer, service interaction information related to recent interactions of the customer with one or more services, transaction information related to recent transactions of the customer, or other activity information associated with the customer. Operation 802 may be performed by a subsystem that is the same as or similar to model subsystem 114, in accordance with one or more embodiments.

In an operation 804, a score category may be determined for each of the confidence scores associated with the predicted intents. As an example, with respect to each predicted intent, the score category may correspond to the tier in which the confidence score of the predicted intent resides. Operation 804 may be performed by a subsystem that is the same as or similar to model subsystem 114, in accordance with one or more embodiments.

In an operation 806, the predicted intents may be assigned to respective sets of predicted intents such that each of the respective sets includes predicted intents across multiple score categories. As an example, based on the assignment, a first set of predicted intents may include at least one predicted intent associated with a confidence score in a first category, at least one predicted intent associated with a confidence score in a second category (e.g., different from the first category), at least predicted intent associated with a confidence score in a third category (e.g., different from the first and second categories), and so on. The second set of predicted intents may include at least another predicted intent associated with a confidence score in the first category, at least another predicted intent associated with a confidence score in the second category, at least another predicted intent associated with a confidence score in the third category, and so on. Operation 806 may be performed by a subsystem that is the same as or similar to model subsystem 114, in accordance with one or more embodiments.

In an operation 808, for each intent of a first set of predicted intents (of the sets of predicted intents), a candidate question may be selected from a question set based on the candidate question matching the intent. As an example, the question set may include questions that are mapped to one or more intents, and a question may be selected for presentation to the customer based on the question being mapped to a predicted intent of the customer. Operation 808 may be performed by a subsystem that is the same as or similar to dialogue subsystem 112, in accordance with one or more embodiments.

In an operation 810, the candidate questions may be presented on a chat interface for presentation to the customer. As an example, within ten seconds (or three seconds or even less) of the chat initiation request, the candidate questions may be simultaneously presented on the chat interface. Operation 810 may be performed by a subsystem that is the same as or similar to presentation subsystem 118, in accordance with one or more embodiments.

In some embodiments, the various computers and subsystems illustrated in FIG. 1 may include one or more computing devices that are programmed to perform the functions described herein. The computing devices may include one or more electronic storages (e.g., prediction database(s) 132, which may include training data database(s) 134, model database(s) 136, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 described herein is for illustrative purposes, and is not intended to be limiting, as any of subsystems 112-118 may provide more or less functionality than is described. For example, one or more of subsystems 112-118 may be eliminated, and some or all of its functionality may be provided by other ones of subsystems 112-118. As another example, additional subsystems may be programmed to perform some or all of the functionality attributed herein to one of subsystems 112-118.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining one or more dialogue items via a prediction model; causing the one or more dialogue items to be presented on a user interface; obtaining a user response to the presentation of the one or more dialogue items; and causing, based on the user response, a response to the user response to be presented on the user interface.
2. The method of embodiment 1, wherein obtaining the one or more dialogue items comprises: providing user activity information associated with a user as input to the prediction model to obtain one or more predicted intents of the user; and obtaining the one or more dialogue items based on the one or more predicted intents.
3. The method of embodiment 2, wherein the user activity information associated with the user comprises page view information related to page views of the user, service interaction information related to interactions of the user with one or more services, or transaction information related to transactions of the user.
4. The method of any of embodiments 1-3, wherein the user activity information comprises non-chat user activity information.
5. The method of embodiment 1-4, wherein the user activity information comprises recent user activity information.
6. The method of any of embodiments 1-5, further comprising: obtaining a chat initiation request from the user, wherein the user activity information associated with the user is provided as input to the prediction model responsive to the chat initiation request.
7. The method of any of embodiments 1-6, further comprising: obtaining an intent set from the prediction model, wherein each intent of the intent set is associated with a probability of matching a current intent of the user; and selecting the one or more predicted intents from the intent set based on the one or more predicted intents being associated with higher probabilities than one or more other predicted intents of the intent set.
8. The method of any of embodiments 2-7, further comprising: selecting the one or more dialogue items for the presentation on the user interface by, for each intent of the one or more predicted intents, selecting a dialogue item from a dialogue item set based on the dialogue item matching the intent.
9. The method of any of embodiments 2-7, further comprising: generating the one or more dialogue items for the presentation on the chat interface by, for each intent of the one or more predicted intents, generating a dialogue item based on the intent.
10. The method of any of embodiments 2-9, wherein obtaining the user response comprises obtaining, via the user interface, a user selection of a first dialogue item of the one or more dialogue items, the first dialogue item matching a first intent of the one or more predicted intents, and wherein causing the response to be presented comprises causing, based on the user selection of the first dialogue item, the response to the first dialogue item to be presented on the user interface.
11. The method of embodiment 10, further comprising: using, based on the user selection of the first dialogue

21 item, the first intent to update one or more configurations of the prediction model.

12. The method of any of embodiments 2-9, wherein a first set of predicted intents comprising the one or more predicted intents is obtained from the prediction model, and a second set of predicted intents is obtained from the prediction model, wherein obtaining the user response comprises obtaining, via the user interface, negative feedback related to the dialogue items.

13. The method of embodiment 12, wherein the negative feedback corresponds to a user request for further options.

14. The method of any of embodiments 12-13, wherein causing the response to be presented comprises causing, based on the negative feedback and the second set of predicted intents, additional dialogue items to be presented on the chat interface.

15. The method of any of embodiments 12-14, further comprising: obtaining, via the chat interface, a user selection of a given dialogue item of the additional dialogue items, the given dialogue item matching a given intent of the second set of predicted intents; determining a feedback score associated with the given intent based on the probability category of the given intent (e.g., such that (i) the feedback score is a first feedback score based on the given intent being in the first category and (ii) the feedback score is a second feedback score based on the given intent being in the second category).

16. The method of embodiment 15, causing, based on the user selection of the given dialogue item, a response to the given dialogue item to be presented on the chat interface.

17. The method of any of embodiments 15-16, further comprising: using, based on the user selection of the given dialogue item, the given intent and the feedback score to update one or more configurations of the prediction model.

18. The method of any of embodiments 12-17, further comprising: assigning the predicted intents to different sets of predicted intents based on probability categories associated with the predicted intents such that (i) the first set of predicted intents comprises at least one predicted intent associated with a probability in a first category and at least one predicted intent associated with a probability in a second category different from the first category, and (ii) the second set of predicted intents comprises at least another predicted intent associated with a probability in the first category and at least another predicted intent associated with a probability in the second category.

19. The method of any of embodiments 1-18, wherein the one or more dialogue items comprises one or more questions or statements.

20. The method of any of embodiments 1-19, wherein the prediction model comprises a neural network or other machine learning model.

21. A tangible, non-transitory, machine-readable medium storing instructions that, when executed by a data processing apparatus, causes the data processing apparatus to perform operations comprising those of any of embodiments 1-20.

22. A system comprising: one or more processors; and memory storing instructions that, when executed by the processors, cause the processors to effectuate operations comprising those of any of embodiments 1-20.

22

What is claimed is:

1. A system for facilitating chat dialogue, the system comprising:
one or more processors programmed with computer program instructions that, when executed, cause operations comprising:
predicting, based on one or more actions of a user on a website, that the user will initiate a chat session with a chat application available via the website after the one or more actions of the user;
in response to the prediction of the initiation of the chat session, and before the initiation of the chat session, obtaining, via a neural network, predicted intents of the user based on activity information associated with the user, the predicted intents comprising a first set of predicted intents;
before the initiation of the chat session with the user, pre-generating questions related to the first set of predicted intents for the chat session; and
causing the questions to be presented on a user interface,
wherein causing the questions to be presented on the user interface comprises:
in response to a first confidence score associated with a first intent of the predicted intents and a second confidence score associated with a second intent of the predicted intents both satisfying a first confidence score threshold, selecting, for presentation on the user interface, first and second questions that respectively correspond to the first and second intents; and
in response to (i) the first confidence score associated with the first intent also satisfying a second confidence score threshold greater than the first confidence score threshold and (ii) the second confidence score not satisfying the second confidence score threshold, causing the first question to be presented to the user before the initiation of the chat session and not presenting the second question to the user until after the initiation of the chat session.

2. The system of claim 1, wherein causing the questions to be presented on the user interface comprises, in response to a user selection of the first question presented to the user, causing the chat session to be initiated and the questions to be presented on the user interface.

3. The system of claim 1, wherein causing the first question to be presented to the user before the initiation of the chat session comprises, in response to (i) the first confidence score associated with the first intent also satisfying the second confidence score threshold and (ii) the second confidence score not satisfying the second confidence score threshold, causing the first question to be presented on a sub-window of the user interface before the initiation of the chat session and not presenting the second question to the user in the sub-window.

4. A method comprising:
one or more processors programmed with computer program instructions that, when executed, cause operations comprising:
predicting, based on one or more actions of a user, that the user will initiate a dialogue session after the one or more actions of the user;
before the initiation of the dialogue session, obtaining, via a prediction model, predicted intents of the user based on (i) the prediction of the initiation of the dialogue session and (ii) activity information associated with the user, the predicted intents comprising a first set of predicted intents;

before the initiation of the dialogue session with the user, generating dialogue items related to the first set of predicted intents for the dialogue session; and causing the dialogue items to be presented on a user interface, wherein causing the dialogue items to be presented on the user interface comprises:

determining that a first confidence score associated with a first intent of the predicted intents satisfies a first confidence score threshold;

selecting, based the determination that the first confidence score associated with the first intent satisfies the first confidence score threshold, a first dialogue item corresponding to the first intent for presentation on the user interface;

determining that the first confidence score associated with the first intent also satisfies a second confidence score threshold greater the first confidence score threshold; and causing, based the determination that the first confidence score associated with the first intent also satisfies the second confidence score threshold, the first dialogue item to be presented to the user before the initiation of the dialogue session.

5. The method of claim 4, further comprising:
determining a user selection of the first dialogue item presented to the user,
wherein causing the dialogue items to be presented on the user interface comprises, based on the user selection of the first dialogue item, causing the dialogue session to be initiated and the dialogue items to be presented on the user interface.

6. The method of claim 4, wherein causing the first dialogue item to be presented to the user before the initiation of the dialogue session comprises causing, based on the first confidence score associated with the first intent also satisfying the second confidence score threshold, the first dialogue item to be presented on a sub-window of the user interface before the initiation of the dialogue session.

7. The method of claim 4, wherein obtaining the predicted intents comprises, in response to the prediction of the initiation of the dialogue session, and before the initiation of the dialogue session, providing the activity information associated with the user as input to the prediction model to obtain the predicted intents of the user.

8. The method of claim 4, further comprising:
obtaining, via the user interface, a user selection of a given dialogue item of the dialogue items, the given dialogue item matching a given intent of the first set of predicted intents;
determining a feedback score associated with the given intent based on a probability category of the given intent such that (i) the feedback score is a first feedback score in response to the given intent being in a first probability category and (ii) the feedback score is a second feedback score in response to the given intent being in the second probability category; and
using, based on the user selection of the given dialogue item, the given intent and the feedback score to update one or more configurations of the prediction model.

9. The method of claim 4, wherein the activity information associated with the user comprises page view information related to recent page views of the user.

10. The method of claim 4, wherein the activity information associated with the user comprises service interaction information related to recent interactions of the user with one or more services or transaction information related to recent transactions of the user.

11. One or more non-transitory computer-readable media storing instructions that, when executed by one or more processors, cause operations comprising:

one or more processors programmed with computer program instructions that, when executed, cause operations comprising:

predicting, based on one or more actions of a user, that the user will initiate a dialogue session after the one or more actions of the user;

before the initiation of the dialogue session, obtaining, via a prediction model, predicted intents of the user based on (i) the prediction of the initiation of the dialogue session and (ii) activity information associated with the user, the predicted intents comprising a first set of predicted intents;

before the initiation of the dialogue session with the user, generating dialogue items related to the first set of predicted intents;

upon the initiation of the dialogue session with the user, causing the dialogue items to be presented on a user interface;

obtaining, via the user interface, a user selection of a given dialogue item of the dialogue items, the given dialogue item matching a given intent of the first set of predicted intents;

determining a feedback score associated with the given intent based on a probability category of the given intent such that (i) the feedback score is a first feedback score in response to the given intent being in a first probability category and (ii) the feedback score is a second feedback score in response to the given intent being in the second probability category; and using, based on the user selection of the given dialogue item, the given intent and the feedback score to update one or more configurations of the prediction model.

12. The media of claim 11, the operations further comprising:

determining that a first confidence score associated with a first intent of the predicted intents satisfies a first confidence score threshold;

selecting, based the determination that the first confidence score associated with the first intent satisfies the first confidence score threshold, a first dialogue item corresponding to the first intent for presentation on the user interface;

determining that the first confidence score associated with the first intent also satisfies a second confidence score threshold greater the first confidence score threshold; and causing, based the determination that the first confidence score associated with the first intent also satisfies the second confidence score threshold, the first dialogue item to be presented to the user before the initiation of the dialogue session.

13. The media of claim 12, the operations further comprising:

determining a user selection of the first dialogue item presented to the user, wherein causing the dialogue items to be presented on the user interface comprises, based on the user selection of the first dialogue item, causing the dialogue session to be initiated and the dialogue items to be presented on the user interface.

14. The media of claim 12, wherein causing the first dialogue item to be presented to the user before the initiation of the dialogue session comprises causing, based on the first confidence score associated with the first intent also satisfying the second confidence score threshold, the first dialogue item to be presented on a sub-window of the user interface before the initiation of the dialogue session.

15. The media of claim 11, wherein obtaining the predicted intents comprises, in response to the prediction of the initiation of the dialogue session, and before the initiation of the dialogue session, providing the activity information associated with the user as input to the prediction model to obtain the predicted intents of the user.

16. The media of claim 11, wherein the activity information associated with the user comprises page view information related to recent page views of the user.

17. The media of claim 11, wherein the prediction model comprises a neural network.

\* \* \* \* \*